C. M. MILLER.
CARRIAGES FOR PORTABLE ENGINES.
No. 189,248.          Patented April 3, 1877.
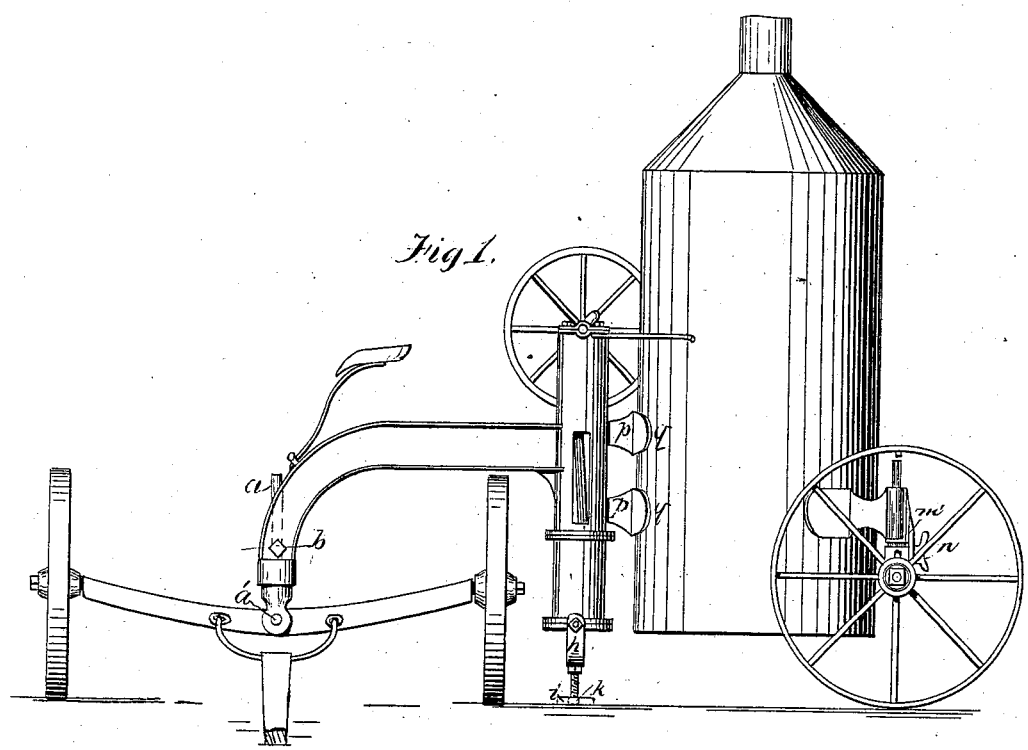
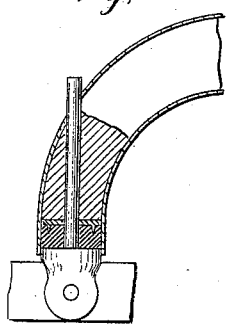
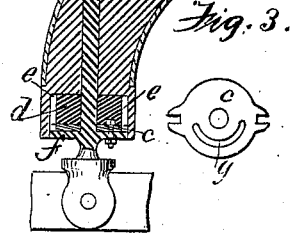
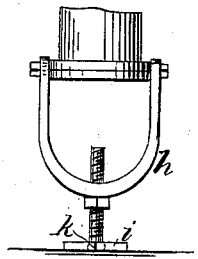
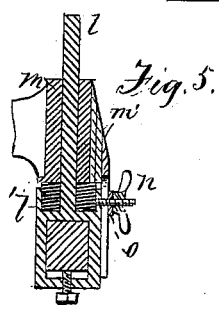
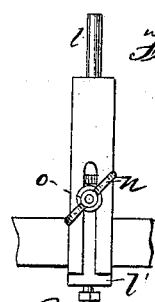
Witnesses.
Grenville Lewis.
A. Church.
Inventor
Cassius M. Miller,
By Hill, Ellsworth & Spear,
His Atty's

UNITED STATES PATENT OFFICE.

CASSIUS M. MILLER, OF SHORTSVILLE, NEW YORK, ASSIGNOR TO BENJAMIN T. ADAMS, OF SAME PLACE, AND ELIAS BEACH AND MARCELLUS A. MORSE, OF CHICAGO, ILLINOIS.

IMPROVEMENT IN CARRIAGES FOR PORTABLE ENGINES.

Specification forming part of Letters Patent No. 189,248, dated April 3, 1877; application filed October 31, 1876.

*To all whom it may concern:*

Be it known that I, CASSIUS M. MILLER, of Shortsville, in the county of Ontario and State of New York, have invented certain new and useful Improvements in Carriages for Portable Engines; and I do hereby declare the following to be a full, clear, and exact description of the same, reference being had to the accompanying drawings, forming part of this specification.

My invention relates to improvements on the carriage for portable engines, for which Letters Patent of the United States were granted me on the 20th day of July, 1875.

The improvements relate, generally, to the holding of the engine in fixed position for work, and more specifically, first, to the connection of the reach with the forward axle; second, to a rest, intermediate between the fore and hind wheels, to support and steady the engine; third, to the means for supporting the boiler on the hind axle; and, fourth, the structure and connection of reach, boiler, and engine. These improvements are described in their proper order, and pointed out specifically in the claims.

The general structure of the machine is the same as that shown in the patent referred to. This is represented in Figure 1 of the drawings.

Fig. 2 represents, in section, the improved connection of the reach to the forward axle, a more elaborate form of which is shown, detached, in Fig. 3.

The intermediate rest is also shown in Fig. 1, but on an enlarged scale, and detached, in Fig. 4.

A section, transversely of the axle of the improvement in the connection to the hind axle, is shown in Fig. 5, said connection being therein represented in place.

Another view of this connection is shown in Fig. 6.

The fourth point is represented clearly in Fig. 1.

In the patent above referred to the forward wheels were locked to the reach by means of set-screws on said reach acting on one of the wheels. This necessitated the bringing of the wheel directly underneath the reach, and consequently the turning of the forward axle at right angles to the rear. This is sometimes attended with difficulty, by reason of inequality of the ground, and the like. The first part of my invention, therefore, has for its object the holding of the axle at any angle without interfering in any respect with the universal joint, necessary for the free and independent movement of the forward wheels. To this end I have provided a king-bolt, $a$, which is connected to the axle, and passes up through a hole in the reach.

The head of this bolt is slotted, so as to embrace the axle, and is held thereto by a pin, $a'$, which permits the said bolt to oscillate on the axle, while, by the free rotary movement of the bolt in the reach, the forward axle may be turned to any angle with the rear. The application of the locking devices to the vertical bolt may be accomplished in several ways, the simplest of which is shown in Figs. 1 and 2, and a more effective in Fig. 3. The first is simply a set-screw, $b$, which passes through a threaded hole in the reach, and, when pressed forward, bears against the bolt, holding it in place against turning. This would give, however, but small bearing-surface for the set-screw, and small leverage thereon.

In Fig. 3 are shown plates which bear against each other, and are connected, one to the reach, and one to axle. The upper plate, connected to the reach, is marked $c$; but for the spring $d$ this might be rigidly connected to the reach. Above it, however, is the spring, against the end of which the reach bears. The plate $c$ must, therefore, be allowed some vertical movement to permit the working of the spring. To give this vertical play, and at the same time to prevent it turning on the bolt, notches are made in the edges of the plate, which slide over guides $e\,e$ in the reach. This prevents any twisting of the plate on the rubber spring. The plate $c$ rests directly on the plate $f$, which is fixed to the shoulder of the king-bolt, or forms a part thereof. These plates, therefore, are the bearing-surfaces for the reach and forward axle. Both are slotted, as shown at *g*, said slots coinciding, when the forward wheels are in line, with the hind. Through this slot is passed a bolt with a nut thereon, so that by tightening this nut the forward wheels may be held at any angle desired.

In both cases, *i. e.*, the form shown in Fig. 2, and that shown in Fig. 3, the bolt passes through the spring, and the spring is interposed between the reach and axle, or shoulder of the bolt.

In order to steady the machine, and especially to guard against the jar of the engine, I have provided the adjustable central support, specified as the second point of my invention. This is shown in Fig. 1 as attached to the lower end of the cylinder; but it may be placed with equal effect upon the boiler, or in any approximately central position. The detail shown in Fig. 4 consists of a bow, *h*, the upper ends of which are pivoted to the head of the cylinder, on each side thereof.

To the lower part is attached a foot, *i*, by means of a threaded bolt, which passes through the bow, and, by means of a nut, or any equivalent device, may be turned to lengthen or shorten it at pleasure.

The foot is attached to the bolt by a ball-and-socket joint, *k*, to suit inequalities of ground. The form of this foot and its connections to the machine may be varied greatly, without departing from the principle of the invention, which is a central support for the machine when in action, and especially to guard against the vibration caused by the engine.

The connections to the rear axle have been simplified and strengthened against strain on the bolts, in the following manner:

The vertical bolts *l l* are screwed, or otherwise fixed in sleeves which inclose the axle, and are held in place thereon by set-screws underneath. Over these bolts are slipped the socketed ends of the brackets *m m*, the lower ends of the sockets bearing on springs, which encircle the bolts and rest on the upper sides of the sleeves *l l*.

A slotted bar, *m'*, on the rear end of the brackets, is extended down over the rear side of the sleeves, and through the slots pass small threaded bolts, screwed into the upper side of the sleeves, which may be made thicker to hold them as well as the large vertical bolts.

Thumb-nuts *n n* on these small bolts, acting on interposed washers *o*, serve to hold the brackets firmly to the sleeves on the axle, and prevent the vibration which the springs would otherwise permit.

These slotted bars are made of sufficient strength to bear against the sleeves on the axle, and relieve the bolts of part of the strain, rendering any other connections between the boiler and the axle unnecessary.

Instead of connecting the rear end of the reach directly to the boiler, as in my former patent, heretofore mentioned, I have connected it, in the manner shown in Fig. 1, to a bracket, *p*, which supports the cylinder and working-shaft of the engine. The cylinder is attached below, and the shaft revolves in bearings in arms above, the piston-rod and pitman moving within the hollow bracket. The bracket *p* is fixed to the boiler, as shown at *q q*.

I claim as my invention—

1. In a carriage for portable engines, having a pivotal connection between the forward end of the reach and the axle mechanism, substantially as described, for locking the forward axle at any angle.

2. The universal joint connection, consisting of the king-bolt, pivoted upon the axle and turning in the end of the reach, when the reach is provided with a stop or clamp, by which the axle may be held at any angle, as set forth.

3. The intermediate adjustable foot for supporting the central part of the carriage, as set forth.

4. The connections for the rear axle, consisting of the socketed bracket sliding on the vertical bolt, and having the bar *m'* bearing against the sleeve on the axle, as set forth.

5. The slotted bar *m'*, fixed to the bracket, working in connection with the threaded bolt, passing through the slot and set-nut thereon, as set forth.

6. In a carriage for portable engines, the combination of the reach with the interposed bracket supporting the engine and driving-shaft, and connected to the boiler, as set forth.

CASSIUS M. MILLER.

Witnesses:
M. CHURCH,
F. MCKENNY.